(12) United States Patent
Nishiwaki

(10) Patent No.: US 8,123,408 B2
(45) Date of Patent: Feb. 28, 2012

(54) LINEAR MOTION GUIDE UNIT

(75) Inventor: Kenjiro Nishiwaki, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 413 days.

(21) Appl. No.: 12/407,888

(22) Filed: Mar. 20, 2009

(65) Prior Publication Data
US 2009/0245703 A1    Oct. 1, 2009

(30) Foreign Application Priority Data

Mar. 26, 2008  (JP) .................................. 2008-080242

(51) Int. Cl.
*F16C 29/06* (2006.01)
(52) U.S. Cl. ............................................... 384/44
(58) Field of Classification Search ................... 384/43, 384/44, 45; 403/329
See application file for complete search history.

(56) References Cited

U.S. PATENT DOCUMENTS

| | | | |
|---|---|---|---|
| 4,886,376 A * | 12/1989 | Osawa ........................... | 384/45 |
| 5,324,118 A * | 6/1994 | Ichida ............................ | 384/44 |
| 6,558,039 B2 * | 5/2003 | Wu ................................. | 384/45 |
| 7,204,036 B2 * | 4/2007 | Kato et al. ..................... | 384/44 |
| 2005/0281497 A1 * | 12/2005 | Akiyama et al. .............. | 384/44 |

FOREIGN PATENT DOCUMENTS

JP            07-091446 A         4/1995

* cited by examiner

*Primary Examiner* — Michael P Ferguson
(74) *Attorney, Agent, or Firm* — Browdy and Neimark, PLLC

(57) ABSTRACT

A linear motion guide unit has a binding strip adapted to fasten a retainer plate to a carriage miniature in dimension, but long in lengthwise direction. The linear motion guide unit has a retainer plate lying lengthwise of the carriage in opposition to load-carrying race to keep more than one roller running through the load-carrying race, and a binding strip to fasten the retainer plate to the carriage. The binding strip is composed of a major part having any number of bents which are positioned at regular intervals in the longitudinal direction of binding strip, and lengthwise opposite angled parts prepared to come into engagement with the end caps, so that the binding strip urges elastically at the bents thereof the retainer to come into close engagement with carriage.

7 Claims, 8 Drawing Sheets

LINEAR MOTION GUIDE UNIT

FIELD OF THE INVENTION

The present invention relates to a linear motion guide unit comprised of an elongated guide rail with raceway grooves, and a slider movable relatively to the guide rail by virtue of more than one rolling element.

BACKGROUND OF THE INVENTION

Linear motion guide units in recent years have become an integral element of a variety of machinery including machine tools, semiconductor fabricating equipment, measuring instruments, assembling machines, and so on. Thus, various linear motion guide units different in construction and size have been developed commercially in conformity with their usage. Advanced machinery of diverse sorts is expected to get more accuracy in operation and more stiff or rigid in mechanical strength even more miniature in construction than ever and, correspondingly, the linear motion guide units are also needed to meet with growing demands for high precision in operation, high stiffness in mechanical strength and yet more miniature in construction.

One example of the prior linear motion guide units is disclosed for example in commonly-assigned Japanese Laid-Open Patent Application H07-91 446. With the prior linear motion guide unit stated earlier, as shown in FIGS. 1 and 3 of the publication recited above, there is provided a retainer plate 5 to keep in place more than one roller and a binding strip 6 is provided to securely hold the retainer plate 5 against a carriage 3 in a snap-action manner. The binding strip 6 is made of metallic plate including steal or the like rich in resilient and made up of a lengthwise major part 31 to fit into a lengthwise groove 29 cut in the retainer plate 5, lengthwise opposite ends 32 of the major part 31 angled to extend away from a guide rail 1 so as to fit into notches cut into outward end surfaces of the end caps 4, and hooked pawls 33 at the extremities of the angled ends 33 heading for the end caps 4.

The binding strip in the linear motion guide unit constructed as stated earlier, however, is usually made straight or just curved as a whole. Such binding strip as recited earlier, when applied to the carriage 1.5 times or above longer than in the ordinary carriage, would get warped across a considerable length around either midway area or lengthwise opposite end areas and, as a result, fail to firmly hold down or fasten the retainer plate over the overall length thereof against the carriage.

Linear motion guide units have become in recent years an integral mechanical element of machinery, which is used installed in the relatively sliding parts in machinery. Accordingly, the linear motion guide units diverse in their sizes and types have been developed into commercial products for a variety of needs or applications. Nevertheless, advanced modern machines including machine tools, semiconductor manufacturing equipment, measurement instruments, assembling machines, and so on are needed to fit high accuracy of submicron levels in traveling operation and position control. To cope with this demand in machines, the linear motion guide units are also in pursuit of high stiffness or strength even miniature in construction.

SUMMARY OF THE INVENTION

The present invention, therefore, has as its principal object to overcome the challenges stated earlier and, in particular, to further improve the linear motion guide unit disclosed in the commonly-assigned senior application recited earlier. The present invention is motivated to miniaturize the linear motion guide unit of the roller type in which cylindrical rollers are selected for rolling elements because of more favorable for high stiffness or mechanical strength than the ball-type in which the rollers are replaced by balls. The present invention is characterized by a binding strip constructed so as to hold securely a retainer plate which is used to keep the cylindrical rollers. The present invention is especially envisaged the provision of the linear motion guide unit in which a slider large in length and yet miniature in size may be actuated with high traveling accuracy. The binding strip of the present is developed to make sure of holding firmly the retainer plate against the carriage even though longer than ever, for example 1.5 times or more as long as the conventional carriages.

The present invention is concerned with a linear motion guide unit comprising an elongated guide rail having thereon a first raceway surface extending along a lengthwise direction of the guide rail, and a slider movable lengthwise of the elongated guide rail by virtue of more than one rolling element, the slider being comprised of a carriage made therein with a second raceway surface in opposition to the first raceway surface and a return passage extending in parallel with a load-carrying race defined between the first and second raceway surfaces, end caps mounted on lengthwise opposite ends of the carriage and made therein with turnaround passages connecting the load-carrying race with the return passage, more than one rolling element allowed to roll through a circulating circuit composed of the load-carrying race, the return passage and the turnaround passages, a retainer extending lengthwise of the carriage along the load-carrying race of the circulating circuit to keep the rollers running through the load-carrying race, and a binding strip to fasten the retainer to the carriage;

wherein the binding strip is composed of a major part having any number of bends which are positioned at regular intervals in the longitudinal direction of binding strip, and lengthwise opposite angled parts prepared to come into engagement with the end caps, so that the binding strip urges elastically at the bends thereof the retainer to come into close engagement with carriage.

In one aspect of the present invention a linear motion guide unit is disclosed in which the binding strip is made of an elastic metal plate including steel and so on which is made in an elongated plate spring slim in thickness while rectangular in cross section, whose major part has the bents of V-shape each of which has an obtuse angle of from 160 to 175 degrees, and whose lengthwise opposite angled parts is further bent into hooks.

In another aspect of the present invention, a linear motion guide unit is disclosed in which the lengthwise opposite angled parts is each composed of a first portion bent at right angle to fit into a slot cut in an outward end surface of the end cap, and a second tip portion further bent at right angle relatively to the first portion to come into engagement with a notch cut in an end of the end cap.

In another aspect of the present invention a linear motion guide unit is disclosed in which the retainer is a retainer plate lying midway between the second raceway surfaces formed on an inward side inside the carriage, the retainer plate having a concave of right-angled shape in transverse section extending lengthwise of the retainer plate so as to fit over a right-angled edge of the carriage protruding between the second raceway surfaces in complementary relation with the concave, the retainer plate on opposite side of the concave further having a recess to fit over the binding strip.

In a further another aspect of the present invention a linear motion guide unit is disclosed in which the major part of the binding strip in stress-free condition gets warped or curved backwards into an arched or bow-shape, whereas after the lengthwise opposite angled parts of the binding strip have been brought into engagement with the notches of the end caps, the major part of the binding strip gets deformed elastically into a straight condition to press down the retainer plate against the carriage, making sure of securely fastening of the retainer plate to the carriage.

In another aspect of the present invention a linear motion guide unit is disclosed in which the carriage has an overall length which is 4 times or more a widthwise dimension of the guide rail normal to the lengthwise direction of the guide rail, and wherein the binding strip extending across an overall length including the carriage and end caps arranged on lengthwise opposite end of the carriage.

In another aspect of the present invention, a linear motion guide unit is disclosed in which the rolling element is any one of a roller and a ball.

The linear motion guide unit of the roller type constructed as stated earlier is in favor of high stiffness or mechanical strength while miniature in dimension. With the linear motion guide unit of the present invention, especially, the carriage is made same in transverse shape as the conventional miniature slider, but has 1.5 times or more, preferably 1.65~1.82 times as long as the conventional carriage.

Moreover, the linear motion guide unit of the present invention features a binding strip designed to keep securely against a long carriage a retainer plate which is made long in conformity with the long carriage. The binding strip in stress-free condition gets warped or curved backwards into an arched or bow-shape. As opposed to the stress-free condition as stated just earlier, when the binding strip gets deformed elastically along the major part thereof into a substantially straight condition after the lengthwise opposite angled parts have come into engagement with the end caps, the binding strip urges elastically the retainer plate against the carriage, making sure of firmly fastening of the retainer plate to the carriage. In addition, the binding strip to keep the longer than ever against the carriage may be well applied to the linear motion guide unit of ball type, not only the roller type.

DETAILED DESCRIPTION OF THE PREFERRED EMBODIMENTS

Figure 1:
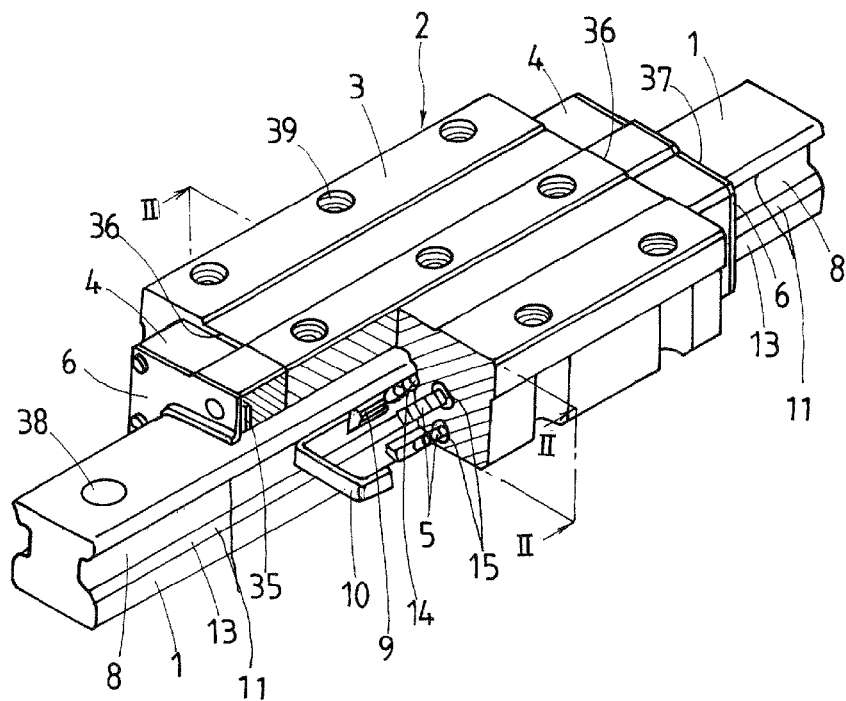
FIG. 1 is a view in perspective, partly cutaway, showing a preferred embodiment of a linear motion guide unit of roller type according to the present invention.

Preferred embodiments of the linear motion guide unit constructed according to the present invention will be explained in detail with reference to the accompanying drawings. The linear motion guide unit of the present invention is best adapted for use in machinery as diverse as machine tools, semiconductor fabricating equipment, precision machines, precision measurement instruments, assembling machines, and so on, which are longing for the linear motion guide units having a high traveling accuracy and a better durability in high velocity and high acceleration/deceleration operation.

The present invention is carried on a linear motion guide unit of roller type which is adapted for use in machine tools because the rollers selected for antifriction rolling elements are in more favor in stiffness or mechanical strength than the balls. More particularly, the present invention is carried on the linear motion guide unit having a slider which, although the same in transverse shape as the conventional roller type, is 1.5 times or more, especially 1.65~1.82 times as long as the conventional slider 2. The linear motion guide unit of the present invention features a binding strip 10 designed to keep securely against a long carriage 3 a retainer plate 9 of a retainer 7 which is made long in conformity with the long carriage 3.

Figure 2:
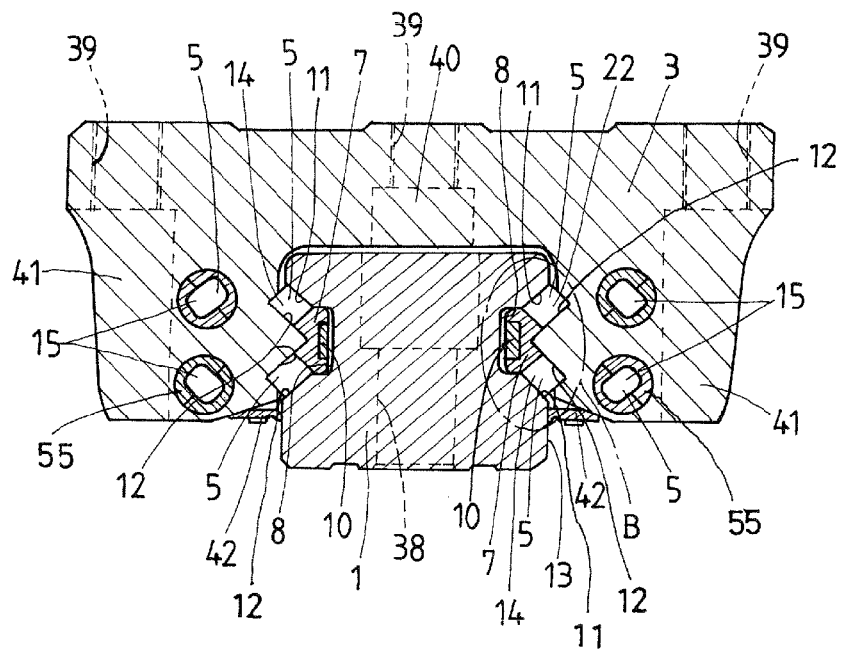
FIG. 2 is a view in transverse section of the section of the linear motion guide unit of FIG. 1, the view being taken along the plane of the line II-II of FIG. 1.

The linear motion guide unit of the present invention, as shown in FIGS. 1 and 2, mainly comprised of an elongated guide rail 1 having widthwise opposing sides 13 on which paired raceway surfaces (first raceway surfaces) 11 are made to extend lengthwise of the guide rail 1, one pair to each side, and a slider 2 that fits over or conform to the guide rail 1 to move lengthwise of the guide rail 1 by virtue of more than one rolling element of roller 5. On each side 13 of the guide rail 1, there is cut a deep groove 8 in a way extending lengthwise flanked by first raceway surfaces 11.

The slider 2 is composed of a carriage 3 made thereon with raceway surfaces (second raceway surfaces) 12 in opposition to the raceway surfaces 11 cut in the guide rail 1 to define load-carrying races 14 between the first and second raceway surfaces 11 and 12 and return passages 15 extending in parallel with the load-carrying races 14, end caps 4 arranged on forward and aft ends 36 of the carriage 3, one to each end, the end caps 4 having sidewise bulged portions 53 formed therein with turnaround passages (refer to FIG. 13) to connect the load-carrying race 14 with the associated return passage 15, end seals 6 attached to outward end surfaces 37 of the end caps 4 to close clearances left between the guide rail 1 and the slider 2, and more than one roller 5 allowed to roll through a circulating circuit which is made up of the load-carrying race 14, return passage 15 and the turnaround passages 16 lying on opposite ends of the load-carrying race 14 and the return passage 10. The slider 2 further has a retainer plate 9 extending lengthwise of the carriage 3 in opposition to the associated load-carrying races to bear the rollers 5 thereon, and a binding strip coming into engagement with the retainer plate 9 to fasten the retainer plate 9 to the carriage 3.

The paired raceway surfaces 12 lying on the carriage 3 are formed on inward sides 30 of sidewise opposed bulges 41, one pair to each side. The end caps 4 is each composed of the end cap major part 34 and a spacer part, not shown, which fits into a recess inside the end cap major part 34 to form the turnaround passage 16 between them.

The guide rail 1 is made with some holes 38 that are used to fasten the guide rail 1 to any stationary bed including machine bed, mounting base, and so on. On the carriage 3, there are made threaded holes 39 that are used to install any object including various instruments, works or the like thereto. Moreover, the slider 2 has lower seals to close clearances left between the slider 2 and the guide rail 1.

With the linear motion guide units constructed as stated earlier, continuous application of lubricant including lubricating oil, grease and the like is inevitable to continue maintaining an adequate lubricant film around the rollers 5 which roll through the load-carrying races 14 defined between the confronting raceway surfaces 11 and 12 while experiencing large load exerted on the slider 2, thereby keeping the rollers 5 against metal-to-metal contact with the guide rail 1 and/or the carriage 3, which might give rise to abnormal wear or scuffing. The end cap 4 has at an upper area 54 thereof a lubrication port 17 to fit over a grease nipple and further has oiling paths 49 extending from the lubrication port 17 to the turnaround passages 16. On the outward end surface 37 of the end cap 4 coming into mating with the end seal 6, there is formed a recess 50 that is made to sink below the outward end surface 37 of the end cap 4. A lubricant impregnated member 35 fits into the recess 50 to reserve the lubricant ample to achieve sustainable lubrication. With the linear motion guide unit of the present invention, lubricant is constantly fed from the lubricant impregnated member 35 to the rollers 5 through holes 52 which open to the turnaround passages 16. Thus, the linear motion guide unit achieves maintenance-free condition for lubrication.

Figure 13:
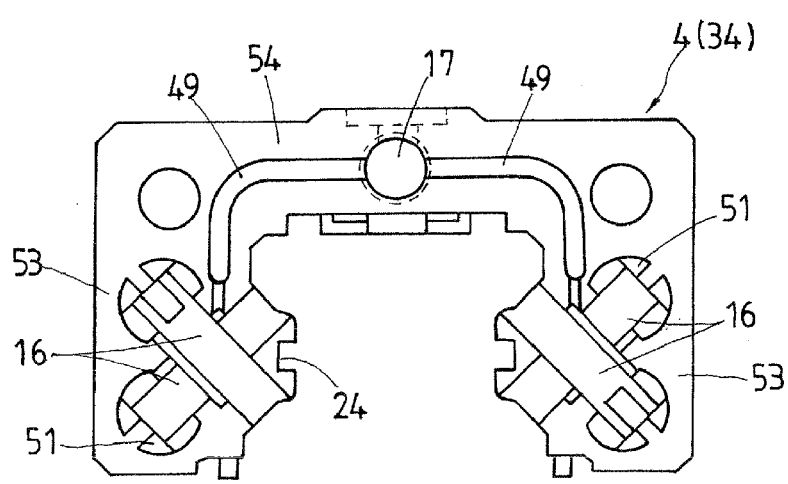
FIG. 13 is a view in rear elevation of the end cap major part of FIG. 12.
Figure 14:
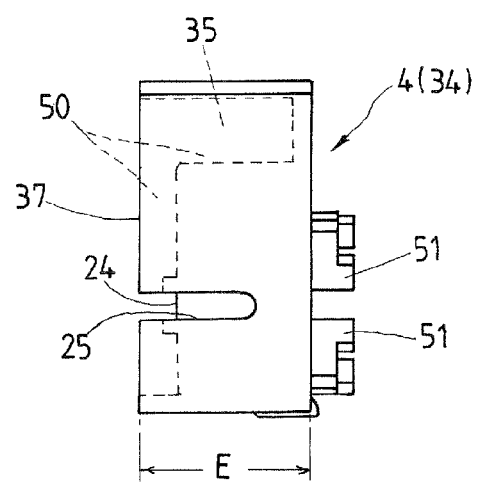
FIG. 14 is a view in side elevation of the end cap major pant of FIG. 12.

The sidewise opposed bulges 41 of the carriage 3, as shown in FIG. 2, have the paired raceway surfaces, one pair for each bulge. Thus, the slider 2 has a pair of circulating circuits on each bulge 41. Any number of roller 5 rolls through any one of the paired circuits circulates from the downside load-carrying race 14 carrying thereon a downward load of the slider 2 into the upside return passage 15 in the carriage 3 while other rollers 5 run through another circuit circulate from the upside load-carrying race 14 carrying thereon an upward load of the slider 2 into the downside return passage 15 in the carriage 3. The turnaround passages 16 as shown in FIG. 13 are made crossed or staggered one another in each one of sidewise bulged portions 53 of the forward and aft end caps 4. The return passages 15 are each defined inside a sleeve 55 which fits into lengthwise bore extending through the carriage 3 while the turnaround passages 16 inside the end caps 4 is communicated with the return passages 15 through spigots 51 raised above the inward surfaces of the end caps 4.

Figure 3:
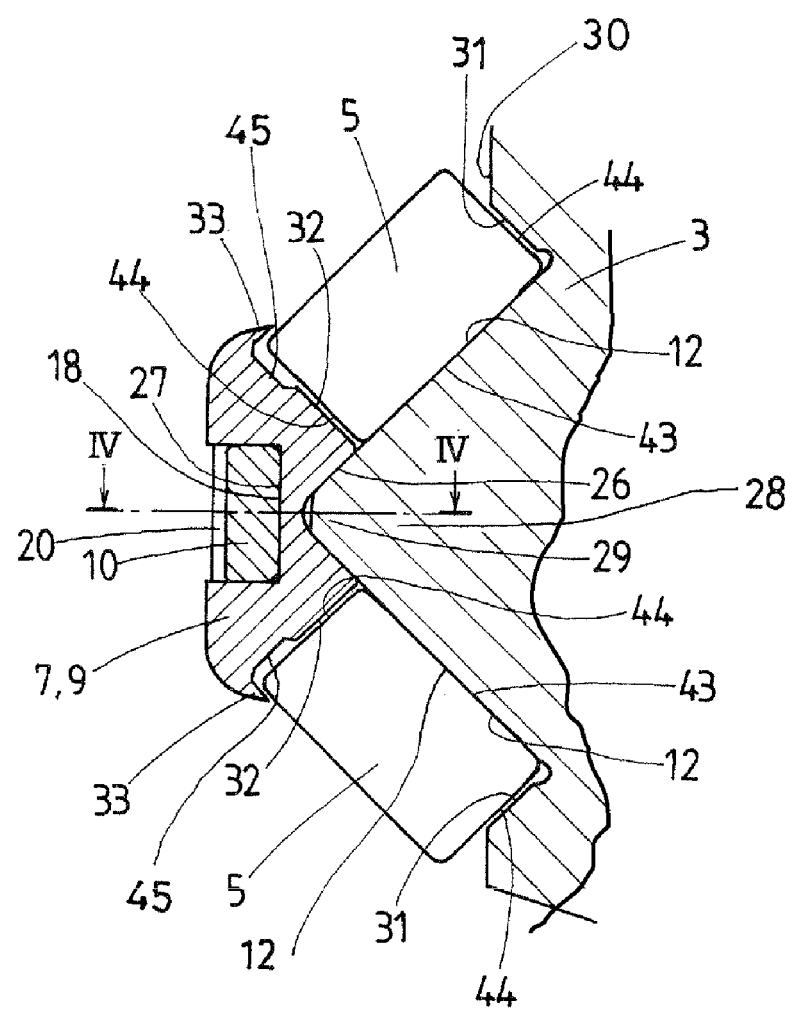
FIG. 3 is an enlarged fragmentary view showing a circled area B in the transverse section of FIG. 2, the view illustrating only the slider and its associated parts.

The sidewise bulge 41 of the carriage 3 as shown in FIG. 3 has a pair of raceway surfaces 12, one of which gets tilted 45 degrees upward in transverse section while the other gets tilted 45 degrees downward in transverse section. The raceway surfaces 12 when viewed in their transverse sections lie in a way intersecting to form a right-angled protruding edge 29. Over the protruding edge 29 of the carriage 3, there is installed the retainer plate 9 to provide the retainer 7, which comes into rolling contact with the rollers 5 rolling through the load-carrying races 14, thereby guiding the rollers 5 properly as well as keeping the rollers 5 against falling away from the slider 2. The rollers 5 each have a circular rolling surface 43 coming into rolling-contact with the load-carrying race 14 defined between the raceway surface 11 on the guide rail 1 and the raceway surface 12 of the carriage 3, and axially opposite ends 44 coming into sliding contact with guide surfaces 31, 32 on the carriage 3 and the retainer plate 9.

Figure 7:
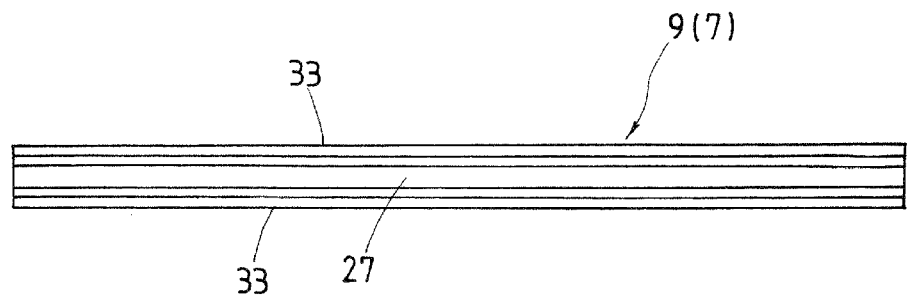
FIG. 7 is a view in plan of a retainer plate of the linear motion guide unit of FIG. 1.
Figure 8:
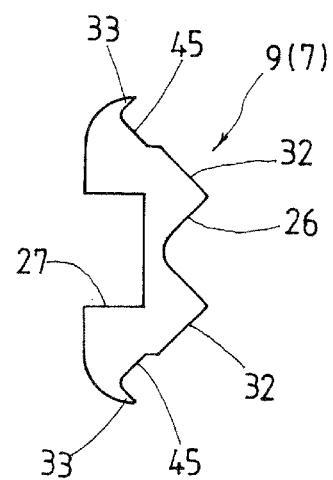
FIG. 8 is a view in side elevation of the retainer plate of FIG. 7.
Figure 9:
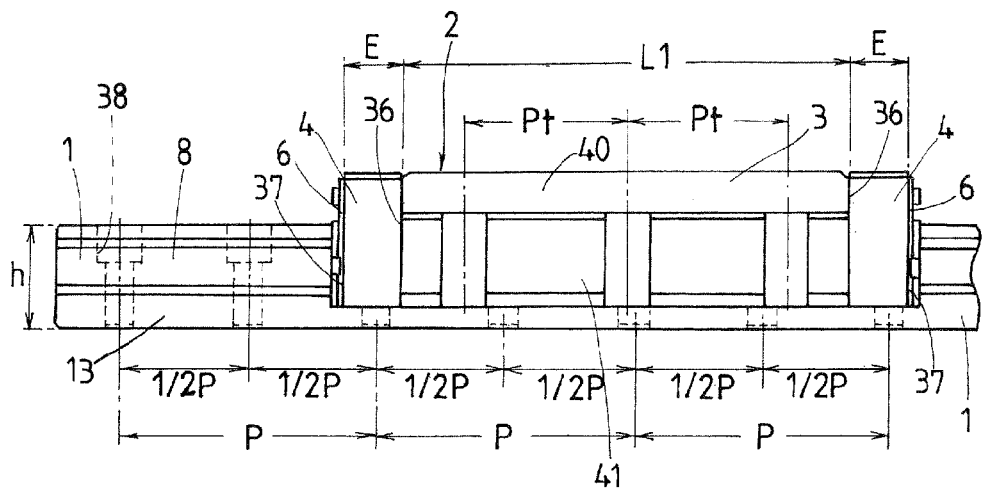
FIG. 9 is a view in front elevation of the linear motion guide unit of FIG. 1.
Figure 10:
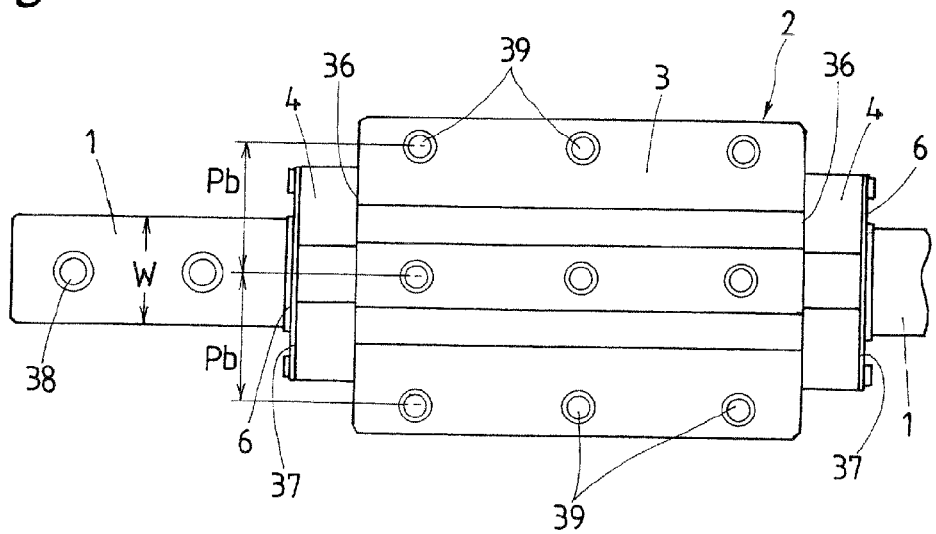
FIG. 10 is a view in plan of the linear motion guide unit of FIG. 9.

The retainer plate 9 as shown in FIGS. 7 and 8 has a concave 26 of right-angled V-shape extending across the overall length of the retainer plate 9 so as to fit over the protruding edge 29 of the carriage 3 in complementary relation with each other. On the opposite side of the concave 26, there is also formed a recess 27 extending in parallel with the concave 26 across the overall length of the retainer plate 9. The recess 27 is intended to fit over the binding strip 10. The retainer plate 9 along the concave 26 thereof can more closely fit over the protruding edge 29 of the carriage 3 by the biting action of elastic resiliency caused with deformation which occurs when the binding strip 10 is forced to fit into the recess 27, whereby the retainer plate 9 is more firmly secured to the carriage 3. The concave 26 of the retainer plate 9 is flanked by guide surfaces 32 to carry the axially opposite ends 44 of the rollers 5. Claw edges 33 to come into engagement with circular edges of the rollers 5 are raised farther out of the guide surfaces 32 in a way lying along the guide surfaces 32 while leaving lengthwise sinks 45 between the guide surfaces 32 and the claw edges 33. The claw edges 33, as seen in transverse section in FIG. 3, are each made to fit inside the deep groove 8 between the raceway surfaces 12 in a way out of touch with the guide rail 1 to leave a slight clearance there. The roller 5 is born at any one of the axially opposite ends 44 against the guide surface 32 of the retainer plate 9 while at the other end 44 against the guide surface 31 of the carriage 3. Thus, the guide surfaces 31, 32 make certain that the rollers 5 roll through the lengthwise raceway surfaces 11, 12 without getting leaned or skew.

Figure 5:
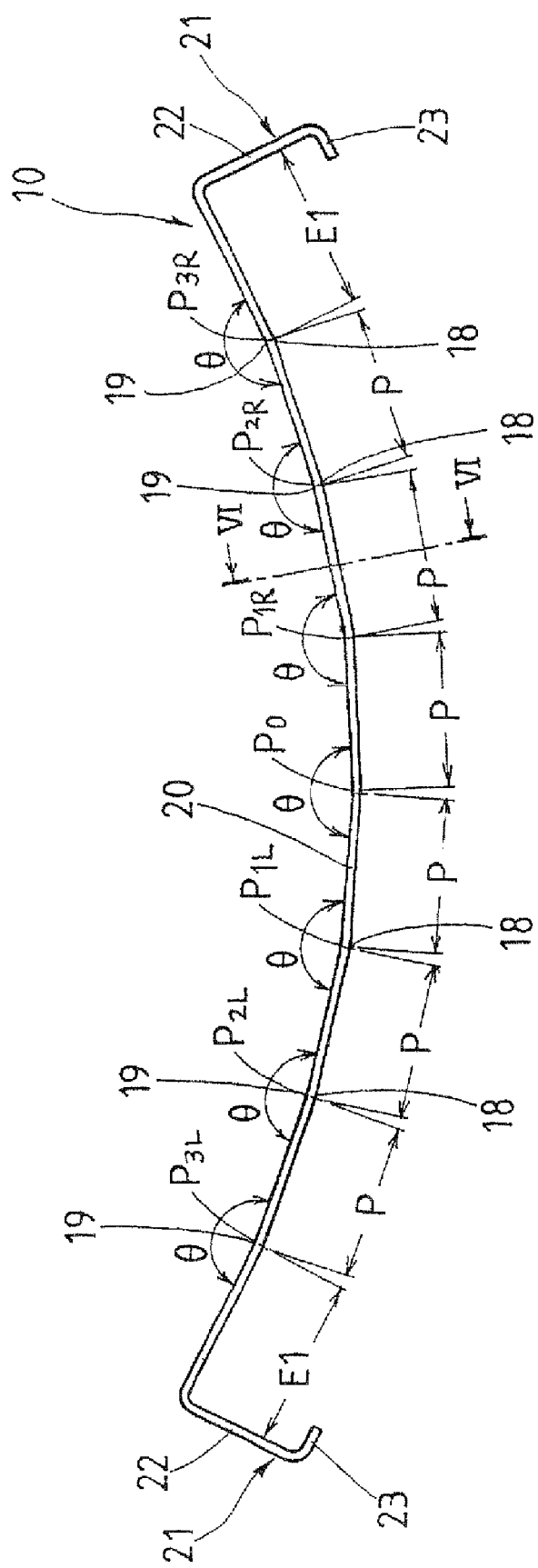
FIG. 5 is a view in elevation of a binding strip, which is shown in stress-free condition prior to assembly in the linear motion guide unit of FIG. 1.
Figure 6:
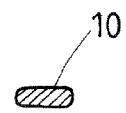
FIG. 6 is a view in transverse section of the binding strip of FIG. 5, the view being taken along the plane of the line VI-VI of that figure.

The linear motion guide unit of the present invention especially features the construction of the binding strip 10. As shown in FIGS. 5 and 6, the binding strip 10 is an elongated member slim in thickness while rectangular in cross section and bent into a desired configuration. Overall, the binding strip 10 is made of elastic metal having spring property, for example a metallic plate spring of steel or the like. The binding strip 10 is composed of a major part 20 prestressed to get warped backward to have elastic force acting lengthwise against the retainer plate 9 to come into close engagement with the retainer plate 9, and lengthwise opposite angled parts 21 prepared to come into engagement with the end caps 4. The lengthwise opposite angled parts 21 each include a first portion 22 bent at right angle to fit into a slot 24 cut in the outward end surface 37 of the associated end cap 4, and a second tip portion 23 further bent at right angle relatively to the first portion 22 to come into engagement with a notch 25 cut in the ends of the end cap 4.

With the linear motion guide unit of the present invention, the major part 20 of the binding strip 10 is bent at a longitudinal midspan P0 to have an obtuse angle θ somewhat less than 180 degrees, for example 160~175 degrees, preferably around 173 degrees so as to form a bent 19 of V-shape whose apex 18 is on to the retainer plate 9. The same V-shaped bends 19 of obtuse angle θ are formed on either side of the midspan P0 at rightward three locations P1R, P2R and P3R and leftward P1L, P2L and P3L which are positioned at regular intervals P in the longitudinal direction of the binding strip 10.

Figure 4:
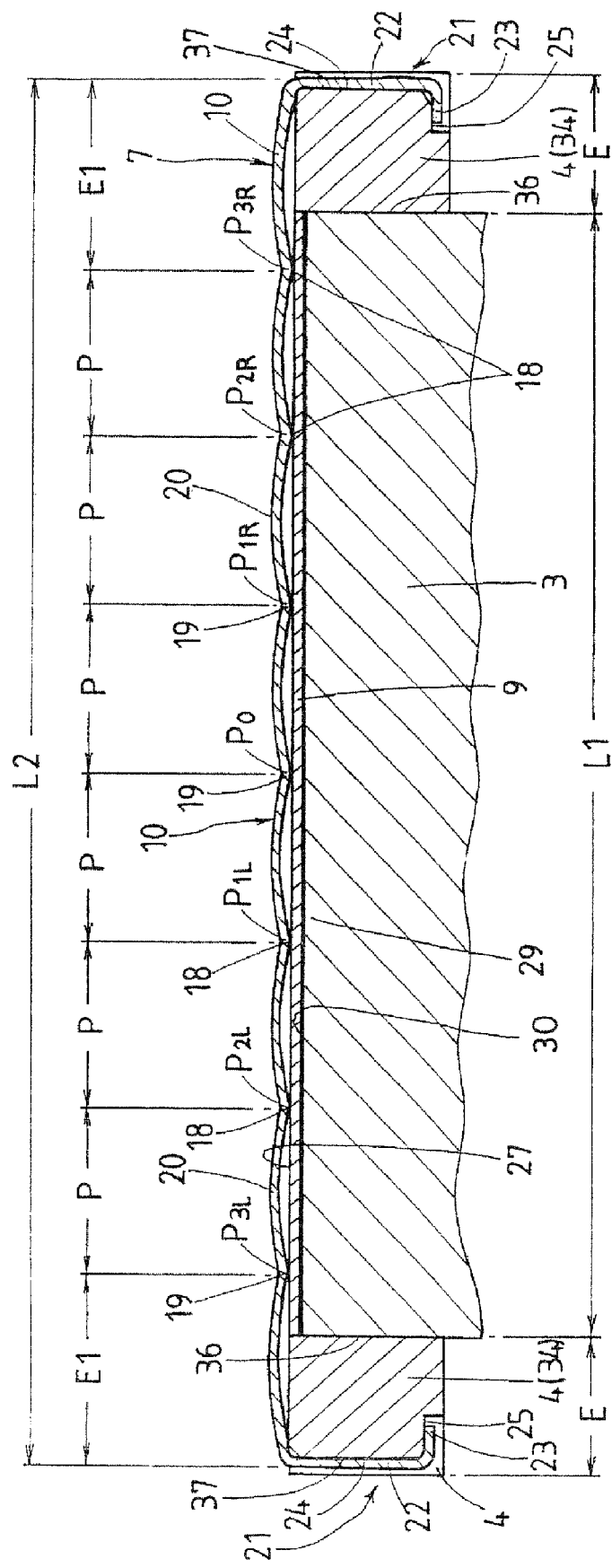
FIG. 4 is a view in longitudinal section taken along the plane of the line IV-IV of FIG. 3.

Overall, the binding strip 10 in stress-free condition gets warped or curved backwards into an arched or bow-shape. As opposed to the stress-free condition as stated just earlier, when the binding strip 10 gets deformed elastically into a straight condition to be mounted to the end caps 4, the bends 19 contribute to the creation of a sustainable elasticity to urge the retainer plate 9 against the carriage 3. As seen in FIG. 4, after the tip portions 23 of the angled parts 21 in the binding strip 10 have been brought into engagement with their mating notches 25 of the end caps 4, the binding strip 10 is deformed elastically to urge the apexes 18 of the bends 19 against the retainer plate 9 in a fashion that the intervals between any two adjacent bends 19 get raised gently. Overall, the binding strip 10 is kept against the retainer plate 9 in a corrugation. Thus, binding strip 10 squeezes or pushes locally the retainer plate 9 against the carriage 3 at the apexes 18 of the bends 19, at seven locations in the illustrated version, which are positioned at lengthwise regular intervals, making sure of securely fastening of the retainer plate 9 to the carriage 3.

Figure 15:
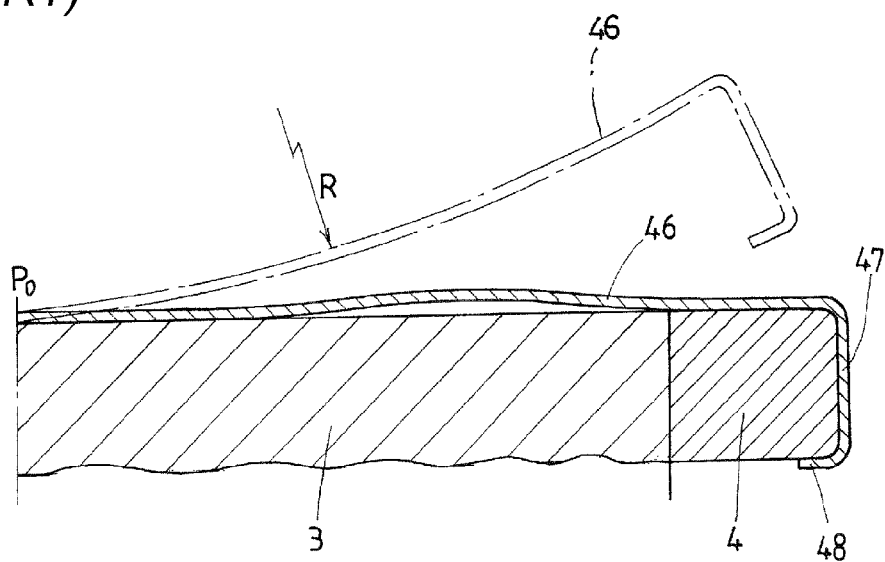
FIG. 15 is a fragmentary view in longitudinal section corresponding to FIG. 4 to illustrate a conventional binding strip.

The binding strip 10 having any number of bends 19 on the major part 20 can be easily produced at low cost by simply bending the elongated member slim in thickness while rectangular in cross section. The binding strip 10 is desirable to closely bear on the retainer plate 9 across the overall length of the major part 20 to urge the retainer plate 9 against the carriage 3 thereby securing firmly the retainer plate 9 to the carriage 3. It was nevertheless found that the binding strip 10 constructed as stated earlier was preferable to cope with a longer slider 2 or longer carriage 3 than ever adopted in the linear motion guide unit that needs ultrahigh stiffness or mechanical strength. A conventional binding strip 46 usually gets warped backwards into a curve having a radius R as shown in FIG. 15 by dot-and-dash lines. Such conventional binding strip 46, when applied to the retainer plate, often rises away from the retainer plate over wide ranges of the major part near by the lengthwise opposite angled ends, failing in pushing down the retainer plate overall. Moreover, the binding strip just straight with no angled end, although not shown, is liable rise away from the retainer plate around middle range thereof and, therefore, very tough to get the overall retainer plate pressed closely against the carriage.

Although but seven bends 19 are shown formed across the major part 20 of the binding strip 10 in the illustrative version, it will be appreciated that any number and/or any shape of the bends 19 may be used depending on the length, shape in transverse section, spring property, and so on of the major part 20 of the binding strip 10. It will be understood that the binding strip 10 constructed as stated earlier, although found better adaptable to the linear motion guide unit in which the rollers 5 are selected for antifriction rolling elements, can be adapted as well to the linear motion guide unit in which the balls are selected for antifriction rolling elements. Moreover, the binding strip 10 of the present invention can be carried on not only the retainer plate 9 in the illustrative version, but also other different retainer 7 to keep the rolling elements. The binding strip 10 is expected to best serve its functional effect on the linear motion guide unit of roller type which is miniature in construction and ultrahigh in stiffness as shown in FIGS. 9 to 14.

Figure 11:
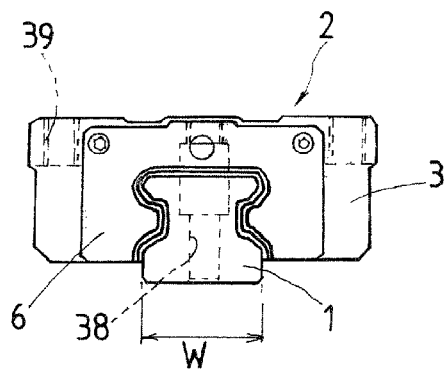
FIG. 11 is a view in side elevation of the linear motion guide unit of FIG. 9.
Figure 12:
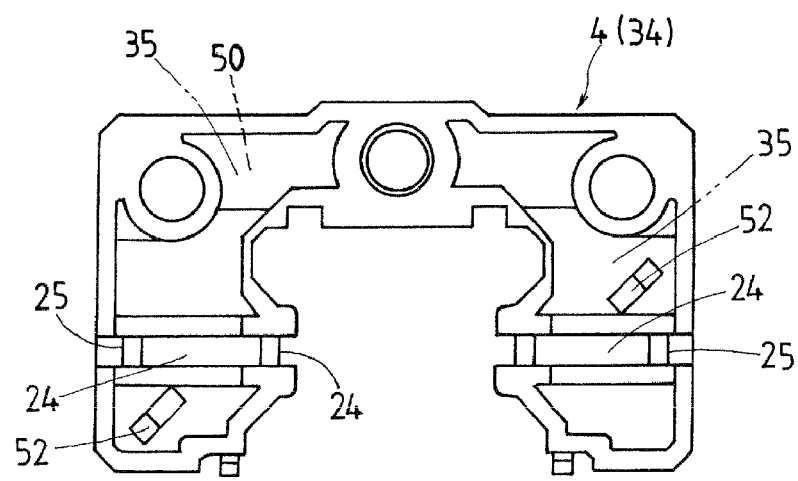
FIG. 12 is a view in front elevation of an end cap, but in which a lubricant impregnated member and a spacer part are both removed to look into an end cap major part.

With the miniature linear motion guide unit of roller type suited for the binding strip 10 of the present invention, the guide rail 1 has the width W of for example 10~30 mm and the slider or carriage, as shown in FIG. 11, has the same end configuration or transverse shape as the conventional roller type. Nevertheless, the carriage 3 has a length L1 longer than ever. Although it is difficult to refer to an unambiguous definition of the length L1 of the carriage 3, the length L1 of the carriage 3 in illustrative version is 4 times or more the width W (widthwise dimension normal to the lengthwise direction) of the conventional guide rail 1, especially L1=4.3~4.7×W.

An alternative definition of the length L1 of the carriage 3 is to refer to the end cap 4 in the slider 2, which has the turnaround passages similar to the conventional passages and the length E as long as the traditional end cap. The length L1 of the carriage 3 in illustrative version is about a matter of 7 times the length E of the end cap 4, especially L1=6.51~7.24×E.

A further another definition of the length L1 of the carriage 3 is to refer to the carriage becoming standard for the conventional slider 2. The carriage in the illustrative version is designed to have the overall length L1 that is 1.65~1.82 times longer than the standard carriage. Thus, the present invention is envisaged firm fastening of the retainer plate 9 against the carriage 3 in any linear motion guide unit having the carriage 3 of the overall length L1 longer than ever as stated earlier. The present invention provides the linear motion guide unit highly superior in stiffness and accuracy even through miniature in construction.

What is claimed is:

1. A linear motion guide unit comprising an elongated guide rail having thereon a first raceway surface extending along a lengthwise direction of the guide rail, and a slider movable lengthwise of the elongated guide rail by virtue of more than one rolling element, the slider being comprised of a carriage made therein with a second raceway surface in opposition to the first raceway surface and a return passage extending in parallel with a load-carrying race defined between the first and second raceway surfaces, end caps mounted on lengthwise opposite ends of the carriage and made therein with turnaround passages connecting the load-carrying race with the return passage, more than one rolling element allowed to roll through a circulating circuit composed of the load-carrying race, the return passage and the turnaround passages, a retainer extending lengthwise of the carriage along the load-carrying race of the circulating circuit to keep the rollers running through the load-carrying race, and a binding strip to fasten the retainer to the carriage;
   wherein the binding strip is composed of a major part having at least one bend which are positioned at regular intervals in the longitudinal direction of binding strip, and lengthwise opposite angled parts prepared to come into engagement with the end caps, so that the binding strip urges elastically, at the at least one bend thereof, the retainer to come into close engagement with carriage,
   wherein the binding strip is an elongated plate spring slim in thickness while rectangular in cross section, and
   wherein the major part has a plurality of bends having a V-shape, each of which has an obtuse angle of from 160 to 175 degrees, and wherein the lengthwise opposite angled parts are further bent into hooks.

2. A linear motion guide unit constructed as defined in claim 1, wherein the binding strip is made of an elastic metal plate including steel.

3. A linear motion guide unit constructed as defined in claim 1, wherein the lengthwise opposite angled parts are each composed of a first portion bent at right angle to fit into a slot cut in an outward end surface of the end cap, and a second tip portion further bent at right angle relatively to the first portion to come into engagement with a notch cut in an end of a corresponding one of the end caps.

4. A linear motion guide unit constructed as defined in claim 1, wherein the retainer is a retainer plate lying midway between the second raceway surfaces formed on an inward side inside the carriage, the retainer plate having a concave of right-angled shape in transverse section extending lengthwise of the retainer plate so as to fit over a right-angled edge of the carriage protruding between the second raceway surfaces in complementary relation with the concave, the retainer plate on opposite side of the concave further having a recess to fit over the binding strip.

5. A linear motion guide unit constructed as defined in claim 4, wherein the major part of the binding strip in a stress-free condition gets warped or curved backwards into an arched or bow-shape, whereas after the lengthwise opposite angled parts of the binding strip have been brought into engagement with notches provided in the end caps, the major part of the binding strip gets deformed elastically into a straight condition to press down the retainer plate against the carriage, making sure of securely fastening of the retainer plate to the carriage.

6. A linear motion guide unit constructed as defined in claim 1, wherein the carriage has an overall length which is 4 times or more a widthwise dimension of the guide rail normal to the lengthwise direction of the guide rail, and wherein the binding strip extends across an overall length including the carriage and end caps arranged on lengthwise opposite ends of the carriage.

7. A linear motion guide unit constructed as defined in claim 1, wherein the rolling elements are one of a roller and a ball.

* * * * *